(12) United States Patent
Cheng (10) Patent No.: US 7,265,840 B2
(45) Date of Patent: Sep. 4, 2007

(54) COUPLING METHOD FOR COUPLING HIGH POWER OPTICAL BEAMS INTO AN OPTICAL WAVEGUIDE

(75) Inventor: Chen-Hsiung Cheng, Westford, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 265 days.

(21) Appl. No.: 11/154,316

(22) Filed: Jun. 16, 2005

(65) Prior Publication Data

US 2006/0285796 A1    Dec. 21, 2006

(51) Int. Cl.
*G01B 11/00* (2006.01)
(52) U.S. Cl. ...................................... 356/399
(58) Field of Classification Search ........ 356/399–400, 356/153
See application file for complete search history.

(56) References Cited

U.S. PATENT DOCUMENTS

| | | | | |
|---|---|---|---|---|
| 5,039,191 A | * | 8/1991 | Myszka | 385/31 |
| 5,177,348 A | * | 1/1993 | Laor | 250/201.1 |
| 5,383,118 A | * | 1/1995 | Nguyen | 700/59 |
| 6,175,675 B1 | * | 1/2001 | Lee et al. | 385/50 |
| 6,590,658 B2 | * | 7/2003 | Case et al. | 356/401 |
| 6,813,023 B2 | * | 11/2004 | Shekel et al. | 356/400 |
| 6,937,335 B2 | * | 8/2005 | Mukai | 356/399 |
| 2002/0033941 A1 | * | 3/2002 | Seward | 356/153 |

* cited by examiner

*Primary Examiner*—Tarifur Chowdhury
*Assistant Examiner*—Isiaka O. Akanbi
(74) *Attorney, Agent, or Firm*—RatnerPrestia (57) ABSTRACT

A method for determining an improved alignment to couple a beam having a high power level into a waveguide. The power of the beam is reduced to a minimum test power level. The reduced-power beam is aligned in a test alignment such that it forms a beam spot on the coupling surface of the waveguide. The coupled power level of the coupled portion of the beam is measured. The power level of the reduced-power beam is increased in steps to a maximum test power level. Corresponding coupled power levels for each power level are measured. If the coupled power level does not saturate and the corresponding coupling efficiency is greater than or equal to the desired coupling efficiency, the current test alignment is determined to be the improved alignment. Otherwise, the test alignment is changed and the new test alignment is tested to see whether it meets the desired standards.

32 Claims, 8 Drawing Sheets

COUPLING METHOD FOR COUPLING HIGH POWER OPTICAL BEAMS INTO AN OPTICAL WAVEGUIDE

FIELD OF THE INVENTION

The present invention concerns a method for improving the coupling of high power optical beams into optical waveguides. In particular, this method may allow for improved coupling of high peak power pulsed lasers beams, such as ultrafast laser beams, into optical fibers.

BACKGROUND OF THE INVENTION

In many applications involving the transmission of optical energy along an optical waveguide, such as an optical fiber, it is desirable to be able to project the best absolute transmission out of the optical waveguide without the need of actually measuring the transmission during operation. For example, the desired amount of energy to be coupled out of the optical probe tip for near-field scanning optical microscope (NSOM) machining is high enough to damage the substrate in the near-field region. Due to the high peak power level pulses used in this application, it is advantageous to use less than the full ablation power during the processes of optical alignment and optimization of the amount of light coupled into the NSOM probe. However, doing so reliably is not necessarily straightforward.

Conventionally, a fixed low power, substantially below the damage threshold of the optical waveguide, is used for alignment and the amount of light coupled into and transmitted through the optical waveguide is optimized at the fixed low power level. An optimized coupling and transmission efficiency may be obtained at this low power. It is assumed that this coupling and transmission efficiency is approximately the same for all power levels, until the fiber is damaged. Therefore, extrapolating the measured coupling and transmission efficiency to a high power input beam is assumed to yield high power output proportionally. However, experimental data, circles 400 and triangle 402 in FIG. 4, demonstrate the existence of a hard transmission saturation that is not revealed using a fixed low power optical beam and the constant-efficiency method described above. This data illustrates that the output power level may not track higher input power level when saturation occurs.

Another issue that may limit the amount of power that may be coupled into and transmitted through an optical waveguide is the potential for damage to the coupling surface of the optical waveguide. High power laser systems, both pulses and continuous wave (CW), may generate intensities high enough to machine, or otherwise damage, the surface of materials, even substantially transparent materials such as those used in optical waveguides. This potential for damaging the coupling surface is one reason that it may be desirable to optimize the optical coupling of optical waveguides at a lower power. Using lower power levels to optimize the optical coupling, however, may lead to alignment configurations in which the coupling surface of the optical waveguide is damaged when the optical beam is set to the desired input power level.

The present invention involves an improved method of optimizing the optical coupling of a high power optical beam into an optical waveguide. This improved method may increase the power level of the portion of the optical beam coupling into the optical waveguide as compared to other methods and may also reduce the potential for damaging the coupling surface of the optical waveguide.

SUMMARY OF THE INVENTION

An exemplary embodiment of the present invention is a method for determining an improved optical alignment to couple an optical beam having a high power level into an optical waveguide. The improved optical alignment is determined such that the power level of the portion of the optical beam coupled into the optical waveguide is substantially maximized. The power level of the optical beam is reduced to a minimum test power level, which is less than about one half of the high power level. The reduced-power optical beam is aligned in a test alignment such that the reduced-power optical beam forms a beam spot on the coupling surface of the optical waveguide. The coupled power level of the portion of the optical beam coupled into the optical waveguide is measured. The power level of the reduced-power optical beam is increased in predetermined steps to a maximum test power level and the corresponding coupled power level is measured for each power level. If the coupled power level does not saturate and the corresponding coupling efficiency at maximum test power is greater than or equal to the desired coupling efficiency, the current test alignment is determined to be the improved optical alignment and the exemplary method is complete. Otherwise the optical beam is reduced in power back to the minimum test power. The test alignment is changed to vary at least one of: the size of the beam spot formed on the coupling surface of the optical waveguide; the position of the beam spot formed on the coupling surface of the optical waveguide; the angle of incidence of the reduced-power optical beam on the coupling surface of the optical waveguide; or the cone angle of the reduced-power optical beam. The new test alignment is tested to see whether the coupled power level saturates and whether the corresponding coupling efficiency is greater than or equal to the desired coupling efficiency. This process continues until an improved optical alignment is found or a predetermined number of iterations are performed. If the predetermined number of iterations are performed without finding an optical alignment that meets the desired standards, the test alignment having the highest corresponding coupling efficiency is determined to be the improved optical alignment. It is noted that after one improved optical alignment is found, the test alignment may be further changed in the same direction for the next iteration. This process may desirably continue until no further improvement is observed.

Another exemplary embodiment of the present invention is a method for determining an improved optical alignment to couple a portion of an optical beam having a high power level into an optical waveguide. The improved optical alignment is determined such that the power level of the portion of the optical beam coupled into the optical waveguide is substantially maximized. The optical beam is aligned in a test alignment such that a beam spot is formed on the coupling surface of the optical waveguide. The power level of the optical beam is varied between a minimum test power level and a maximum test power level. This variation occurs according to a periodic waveform that has a predetermined period. The maximum test power level is less than about one half of the high power level. A number of coupling efficiencies corresponding to the test alignment are determined such that at least four of these coupling efficiencies are determined during one predetermined period of the periodic waveform. The test alignment is changed and the optical beam variably reduced-power until the coupling efficiencies corresponding to one of the test alignments are substantially constant. Changing the test alignment involves varying at least one of: the size of the beam spot formed on the coupling surface of the optical waveguide; the position of the beam spot formed on the coupling surface of the optical waveguide; the angle of incidence of the reduced-power optical beam on the coupling surface of the optical waveguide; or the cone angle of the reduced-power optical beam. The test alignment for which the corresponding coupling efficiencies are substantially constant is determined to be the improved optical alignment. It is noted that an optimal optical alignment may be selected the one with best output power at the maximum test power level among a number of improved optical alignments.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

Figure 4:
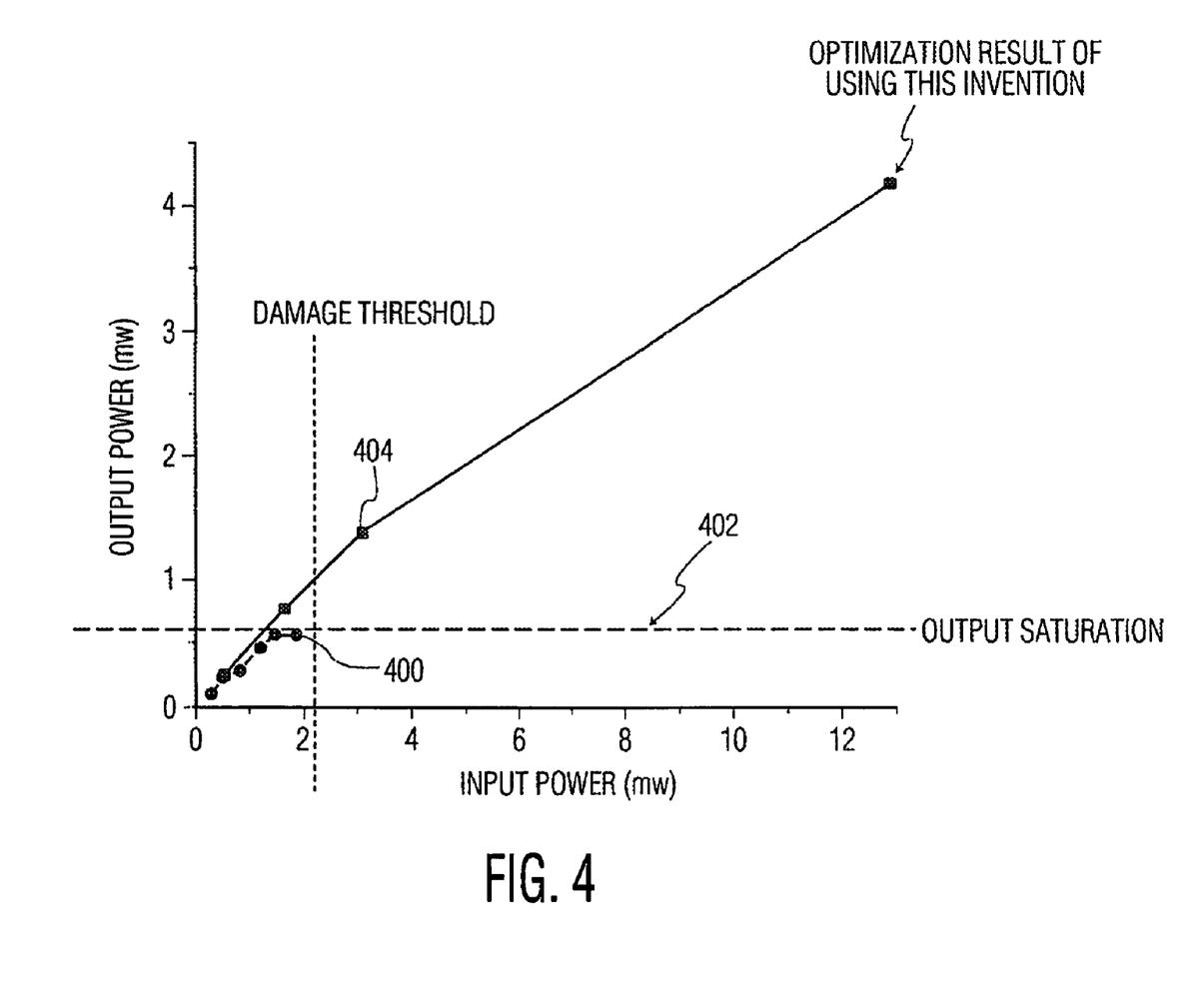
FIG. 4 is a graph illustrating exemplary test results of the exemplary method of FIG. 2.

An exemplary embodiment of the present invention is a method to determine an improved optical alignment configuration for coupling a high power optical beam into an optical waveguide. This exemplary method desirably minimizes or diminishes saturation of the coupled optical power at reduced power levels that are desirably less than the damage threshold of the optical waveguide. One exemplary approach to minimizing this coupled optical power saturation is to measure the coupling efficiency of a number of test alignments at various reduced power levels and obtain a saturation diagram for each, as shown in FIG. 4 by circles 400 and squares 404. These diagrams may be extrapolated to higher power levels to predict the corresponding output power. The process may be iterated for different optical test alignment and focusing configurations until the projected output power corresponding to the desired high power input is substantially optimized. Exemplary optical waveguides for which the present invention may prove beneficial include all types of optical fibers as well as planar optical waveguide structures.

It is noted that the exemplary embodiments of FIGS. 1, 3, 7, and 8 include attenuator 100 to reduce and/or vary the power level of the high-power optical beam being coupled into the optical fiber. It is contemplated, however, that this element may be omitted from the exemplary test alignment configuration and that the power level of the high-power optical beam may be varied by directly controlling the output power of the optical source used to generate the high power optical beam.

Figure 1:
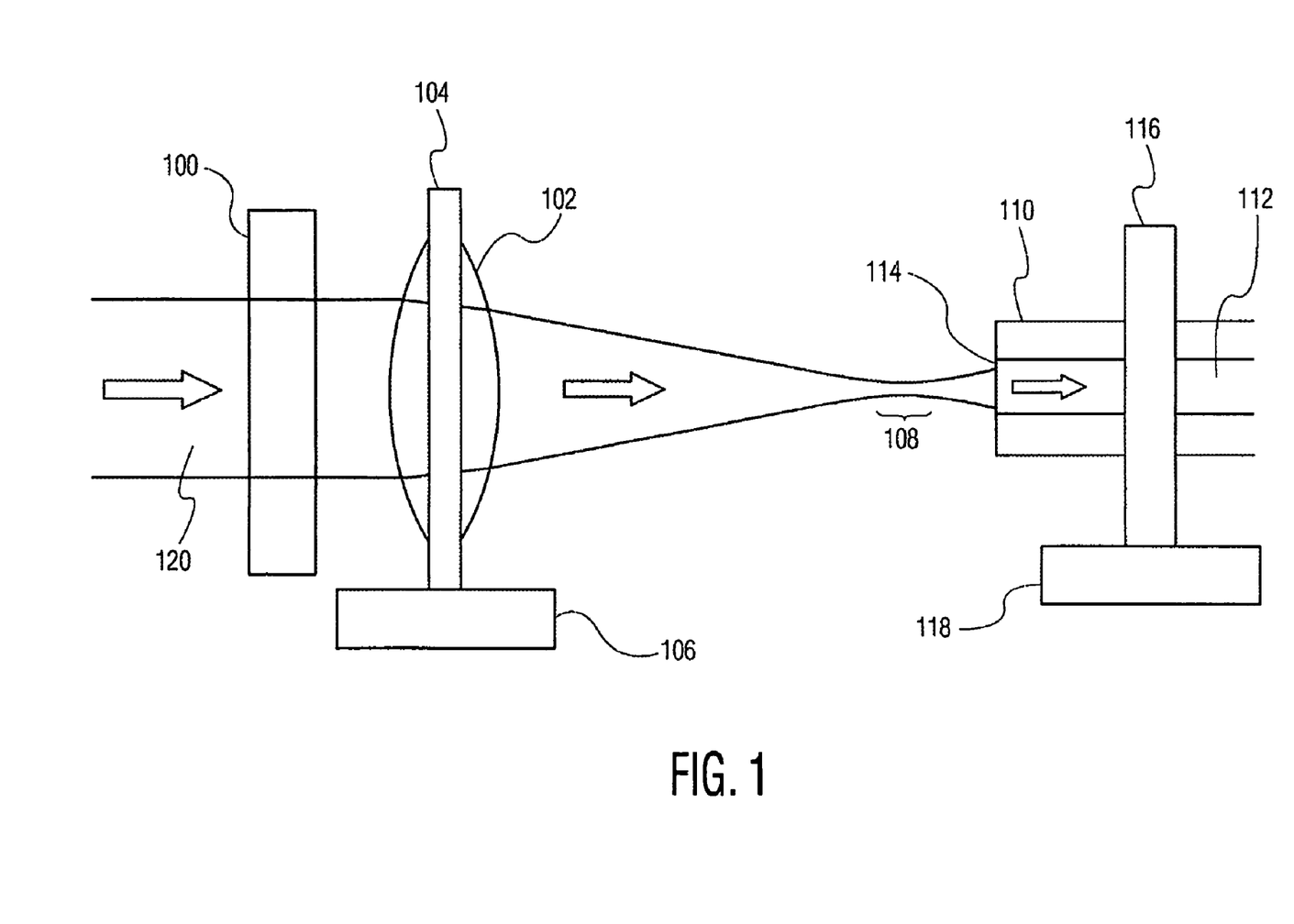
FIG. 1 is a side plan drawing illustrating an exemplary test alignment configuration that may be used in any of the exemplary methods of the present invention.

FIG. 1 illustrates an exemplary test alignment configuration that may be used to couple optical beam 120 into an optical waveguide, in this case, optical fiber 110. Although FIG. 1 specifically includes an optical fiber and a single lens as the coupling optics, these choices are merely illustrative and are not meant to be limiting.

This exemplary test alignment configuration includes variable optical attenuator 100, coupling optics (lens 102 which is mounted in lens holder 104), and an optical waveguide mount (fiber holder 116) to hold the optical waveguide such that a beam spot of the optical beam is formed on the coupling surface (cleaved fiber end 114) of the optical waveguide. High power optical beam may be a high power optical beam generated by any optical source, including high power arc lamps, high power incandescent lamps, high power gas discharge lamps, high power LED's, high power CW lasers, high power pulsed lasers, and ultrafast lasers. Variable optical attenuator 100 may be an acousto-optical attenuator, an electro-optical attenuator, a polarizer-based attenuator (whether electro-optically or mechanically controlled), or any other optical attenuator sufficiently robust to attenuate high power optical beam 120.

The test alignment configurations may be varied using two axis control of lens 102 and/or optical fiber 110 to change the position and incident angle of the beam spot of the attenuated optical beam on cleaved fiber end 114 and using one or both of motion stages 106 and 118 to change the size of the beam spot on cleaved fiber end 114. The position of the beam spot of the attenuated optical beam on cleaved fiber end 114 may be moved using translation means in lens holder 104 to move lens 102, translation means in fiber holder 116 to move optical fiber 110, X and/or Y linear translation stages included in motion stage 106 to move lens 102, X and/or Y linear translation stages included in motion stage 118 to move optical fiber 110, or a combination thereof. The size of the beam spot on cleaved fiber end 114 may be varied using a Z linear translation stage included in motion stage 106 to move lens 102 and/or a Z linear translation stage included in motion stage 118 to move optical fiber 110 to change the separation between lens 102 and cleaved fiber end 114. Additionally, one or two tilt stages may be included to allow variation to the angle of incidence of the optical beam on cleaved fiber end 114.

Cone angle of the focused beam, or numerical aperture of the coupling optics, is another factor that affects optical coupling. Using a weaker power lens system to focus the beam or reducing the beam diameter before the focusing lens can increase the beam diameter as well as reduce the cone angle at the fiber end 114. Alternatively, if a multi-element lens system is used as the coupling optics the beam spot size and/or position on cleaved fiber end 114, as well as the cone angle, may varied by internal movement of the components of the multi-element lens system.

It is noted that the exemplary test alignment illustrated in FIG. 1 is configured such that beam waist 108 is located before the attenuated optical beam is incident upon cleaved fiber end 114 so that optical beam 120 is diverging when it is coupled into optical fiber 110. The diameter of beam at fiber end 114 may be larger than the core diameter of optical fiber 110. Although this exemplary test configuration may have a lower reduced-power coupling efficiency compared to an exemplary test alignment configuration in which the optical beam is focused to a minimum beam spot size on cleaved fiber end 114, this exemplary configuration may be desirable to increase the damage threshold power level. This is because the damage threshold of the optical waveguide material is dependent on the intensity of the optical beam (or fluence for pulsed optical beams) and increasing the beam spot size decreases the intensity (or fluence) on the surface at a given power level.

Also, the beam spot formed on cleaved fiber end 114 by optical beam 120 in FIG. 1 is shown to be centered on cleaved fiber end 114 and to fill, substantially, the optical fiber core 112. This alignment may prove desirable, but it is contemplated that in some situations an off center alignment or an alignment in which the beam spot is larger than optical fiber core 112 may be desirable, particularly for optical beams having extended transverse intensity patterns and for coupling into those optical waveguides with weak index contrast between core and cladding.

Figure 7:
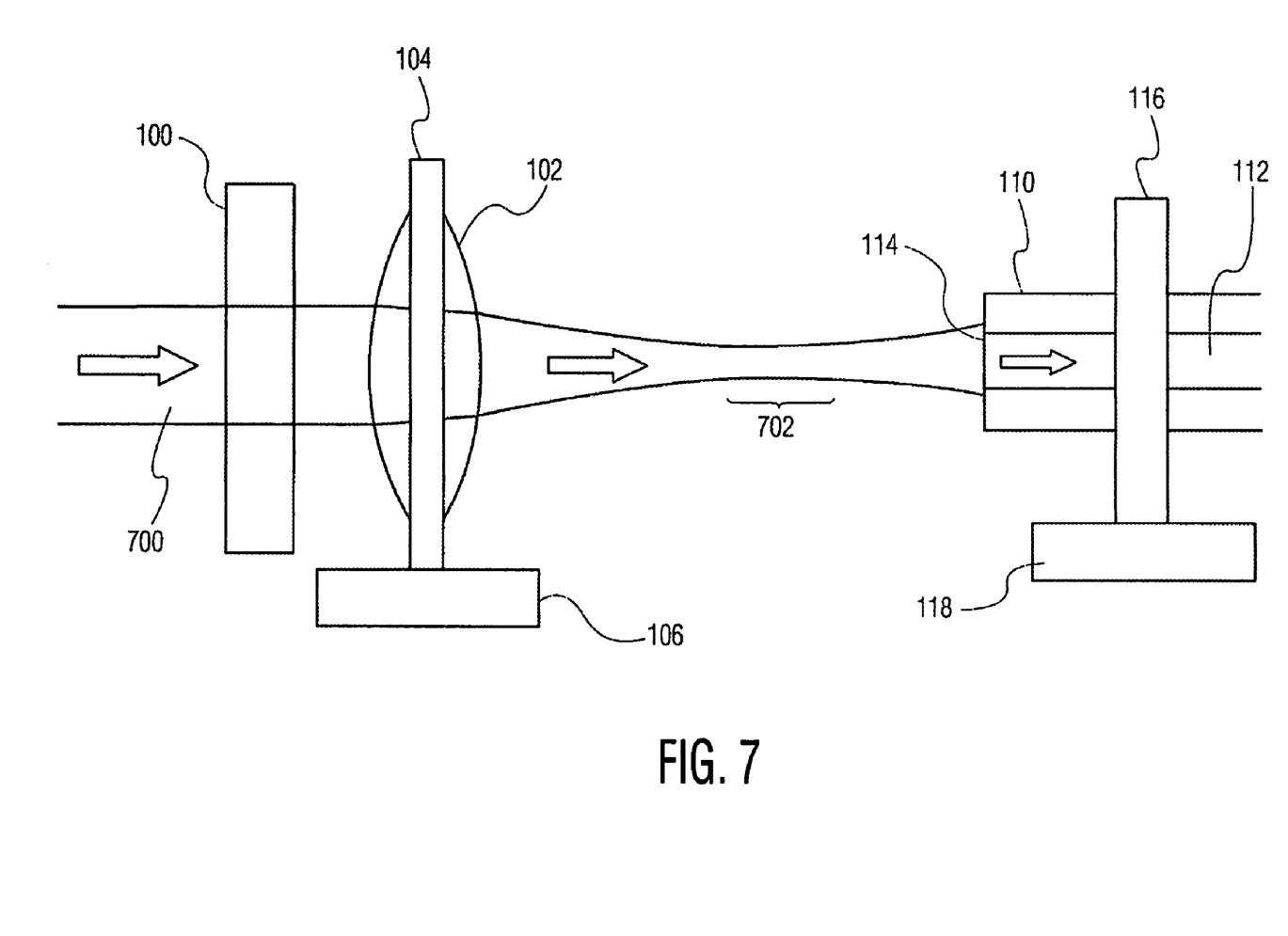
FIG. 7 is a side plan drawing illustrating another exemplary test alignment configuration that may be used in any of the exemplary methods of the present invention.

FIG. 7 illustrates a similar exemplary embodiment. In the exemplary embodiment of FIG. 7, optical beam 120 is replaced by optical beam 700, which has a reduced cross-sectional area. Because of the reduced cross-sectional area of optical beam 700, the resulting cone angle of the focused beam is shallower and the minimum size beam spot formed in beam waist 702 is larger that in the exemplary embodiment of FIG. 1. Both the shallower cone angle and the larger minimum spot size have been found to improve coupling of high power levels into optical fiber 110. Coupling may be further improved by placing cleaved end 114 of optical fiber 110 at the focus of optical beam 700 and increasing the minimum beam spot size to be equal to or greater than the cross-sectional area of fiber core 112.

Figure 8:
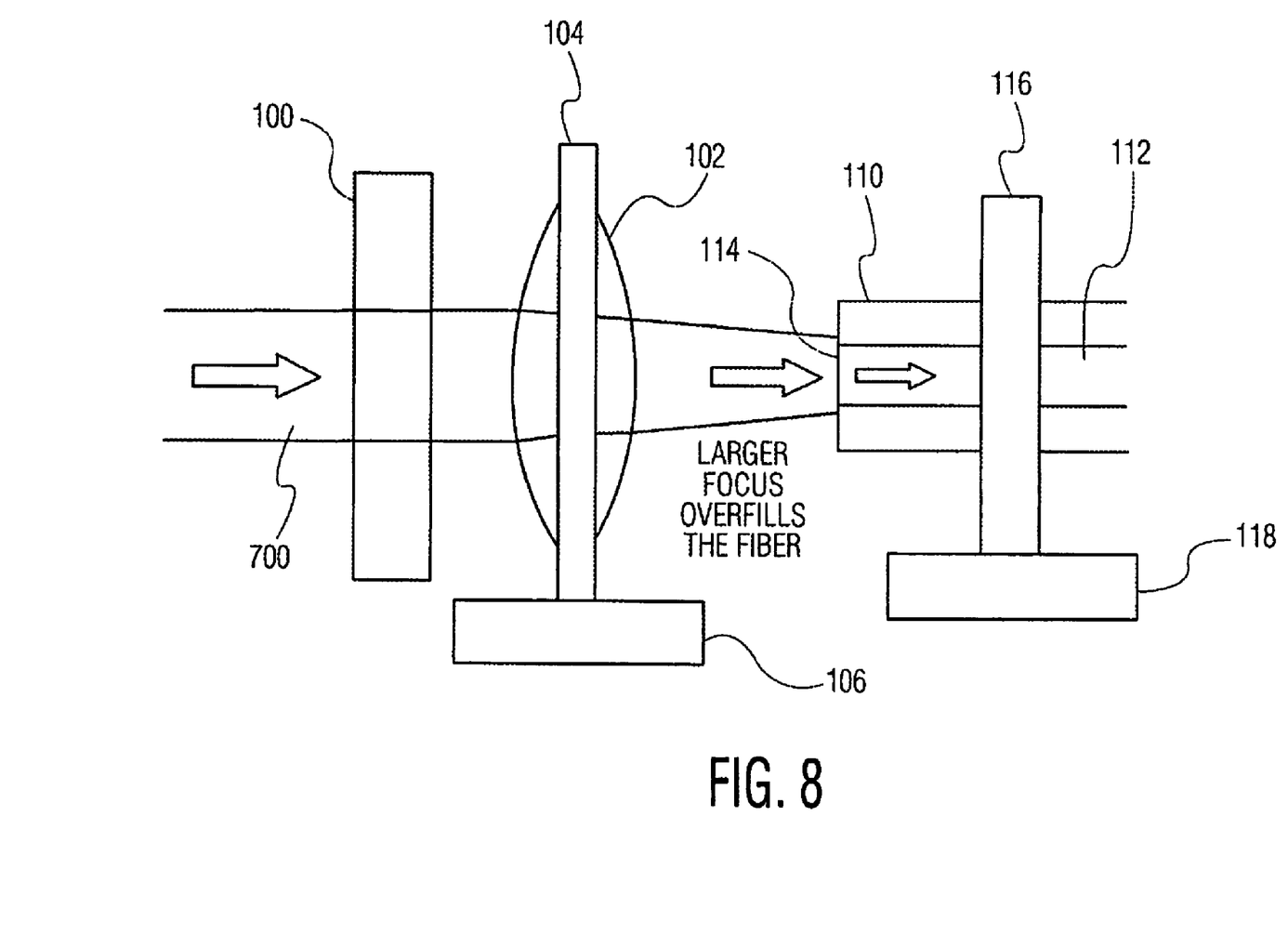
FIG. 8 is a side plan drawing illustrating an alternative exemplary test alignment configuration that may be used in any of the exemplary methods of the present invention.

It is also noted that if optical beam 700 is converging at cleaved fiber end 114, the intensity in the beam spot may be reduced such that the surface is not damaged at the desired high power level. While the intensity of the converging optical beam may increase within optical fiber 110 and cause an internal portion of fiber core 112 to be damaged instead, it has been found that this is not always the case. FIG. 8 illustrates an exemplary embodiment of the present invention in which a converging beam is used. In this embodiment, the beam spot of the converging optical beam is desirably larger than the cross-sectional area of fiber core 112. Diffraction effects caused by coupling the optical beam into the small aperture of the fiber core and refraction at the cleaved surface 114 into fiber core 112 and the fiber cladding may sufficiently interfere with focusing of the converging optical beam within optical fiber 110 to substantially decrease the likelihood of damaging an internal portion of fiber core 112.

Figure 2:
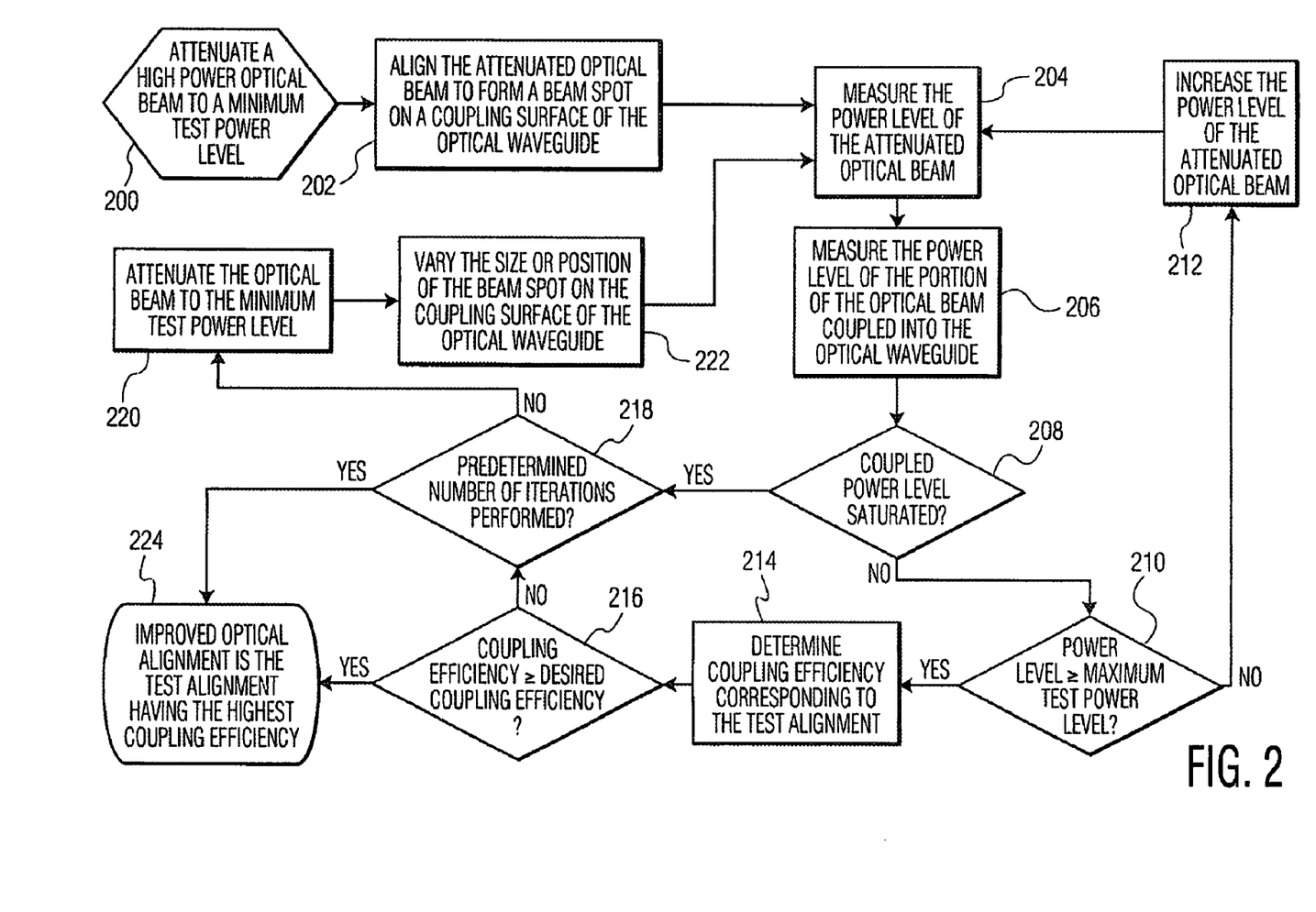
FIG. 2 is a flow chart illustrating an exemplary method of determining an improved alignment for optically coupling high power optical beams into an optical waveguide according to the present invention.

FIG. 2 illustrates an exemplary method for determining an improved optical alignment to couple an optical beam having a high power level into an optical waveguide according to the present invention. The improved optical alignment is determined such that the power level of a portion of the optical beam that is coupled into the optical waveguide is substantially maximized. This exemplary method may be performed using the exemplary test alignment configurations illustrated in FIGS. 1, 7, and 8.

The optical beam is attenuated to a minimum test power level, step 200. As described above with reference to FIG. 1, this attenuation may be accomplished using variable attenuator 100. The minimum test power level is desirably low enough that the focused beam is not able to damage the coupling surface of the optical waveguide. It is noted that, for pulsed optical beams, the pulse energy may be a more desired parameter to use. However one skilled in the art may understand that pulse is merely the power level integrated over the pulse width. The minimum test power level is desirably less than about one half of the high power level of the optical beam that is intended to be used after optical alignment, with values of 1-5% of the high power level, or even lower, being more typical. It is noted that the optical beam may also be attenuated by reducing the power level of the optical beam generated by the optical sources, but for some types of optical sources reducing the output power level may have other effects on the optical beam that may undesirably complicate the alignment process.

The attenuated optical beam is aligned in a test alignment such that the beam spot of the attenuated optical beam is formed on a coupling surface of the optical waveguide, step 202. FIGS. 1, 7, and 8 illustrate exemplary test alignment configurations and coupling optics that may be used to accomplish this step. In one exemplary embodiment, the attenuated optical beam is aligned such that the attenuated optical beam is diverging at the beam spot. The beam spot may desirably be centered on the coupling surface of the optical waveguide and a focusing optical coupling element, such as lens 102, may be used to focus optical beam such that the size of the beam spot form on coupling surface 114 is substantially minimized. The separation between the focusing optical coupling element and the coupling surface may then be increased slightly, so that the size of the beam spot formed on the coupling surface of the optical waveguide is increased and the optical beam at this point is diverging. As described above with reference to FIG. 1, this initial test alignment may desirably increase the damage threshold power level.

As shown in the exemplary embodiments of FIGS. 7 and 8, the power of lens 102 and/or the entrance diameter of optical beam 700 into this lens may be affect the initial test alignment configuration used in step 202. For example, the exemplary embodiment illustrated in FIG. 8 uses a converging optical beam desirably with a beam spot on cleaved fiber end 114 larger than the cross-sectional area of fiber core 120. The use of a large beam spot in this exemplary embodiment may also desirably increase the damage threshold power level.

Alternatively, the initial test alignment may be chosen such that the coupling efficiency at the minimum test power level for the initial test alignment is substantially maximized. This alternative embodiment uses the alignment found using the prior art method as a starting point.

Figure 3:
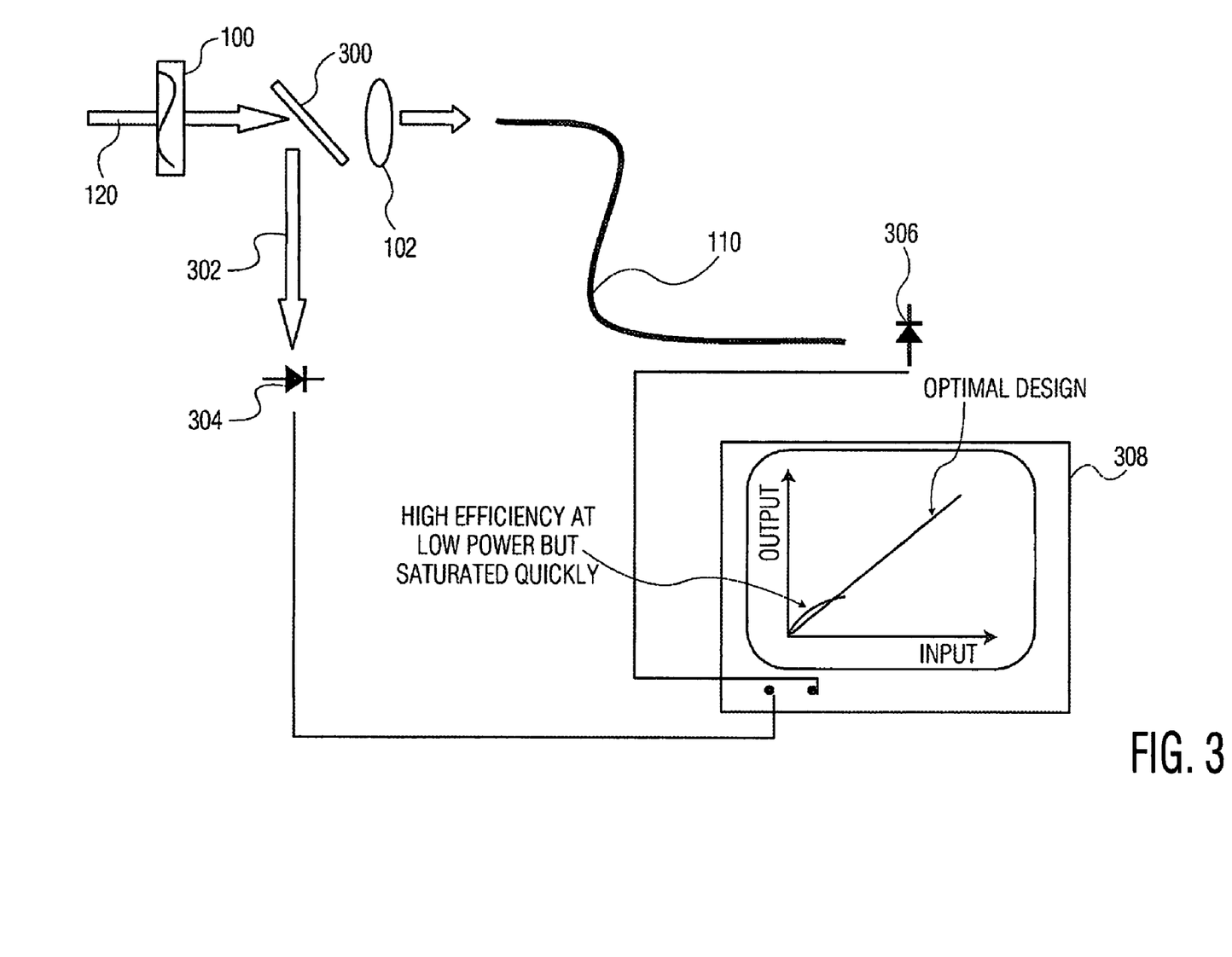
FIG. 3 is a schematic block diagram illustrating an exemplary test set up that may be used to perform the exemplary method of FIG. 2.

The power level of the attenuated optical beam is measured, step 204, and so is the coupled power level of the portion of the optical beam coupled into the optical waveguide, step 206. The power level of the attenuated optical beam and the coupled power level of the portion of the optical beam coupled into the optical waveguide may be used to determine the coupling efficiencies of the optical beam into the optical waveguide. FIG. 3 illustrates exemplary means to measure the power level of the attenuated optical beam and the coupled portion of the optical beam. As shown in FIG. 3, measurement portion 302 of the attenuated optical beam may be separated by beam splitter 300 and measured by an optical detector 304. Beam splitter 300 may be any standard type of beam splitter, although it may be desirable for beam splitter 300 to only couple a small amount of the power of optical beam into measurement portion 302. This is because it may be inconvenient to remove beam splitter 300 from the optical path after alignment, as doing so may affect the improved optical alignment, and it may be undesirable to split off a significant portion of the high power optical beam during operation.

The coupled power level of the coupled portion of the optical beam may be measured by optical detector 306, which is located at the output end of optical fiber 110. Optical detectors 304 and 306 may be any standard type of optical detector and may desirably be selected based on the parameters of optical beam 120. It is noted that optical detector 306 may desirably be formed inline with the optical waveguide or may be coupled to the optical waveguide via an optical tap, rather than arranged to measure the coupled optical beam after it is coupled out of the optical waveguide, as shown in FIG. 3.

The coupled power level measured in step 206 and/or the coupling efficiency are analyzed to determine whether the coupled power level has saturated, step 208. FIG. 3 illustrates an exemplary means to determine saturation of the coupled power level. The power level of the attenuated input beam measured by optical detector 304 and the coupled power level measured by optical detector 306 are electrically coupled into digital acquisition device (DAQ) 308. DAQ 308 may collect and average each measurement signal over a selected time frame, scale the two measurement signals, and plot the data on Cartesian graph as shown in FIG. 3. Alternatively, special purpose circuitry, an ASIC, and/or a general purpose computer may be used to compile and display the measurement data. The determination of whether the coupled power level is saturated may be based on a comparison of the coupled power level corresponding to the current power level of the attenuated optical beam to at least one previously determined coupled power level corresponding to a lower power level.

For example, as shown in FIG. 4, the coupled power levels (output power) of the two circles corresponding to the highest attenuated optical beam power levels (input power) show no increase in output power with increased input power, i.e. saturation. Alternatively, the coupling efficiency corresponding to each input power level may be calculated. This calculation is based on the power level of the attenuated beam and the coupled power level. The coupling efficiency may be defined as the coupled power level divided by the power level of the attenuated beam. Alternatively, it may be defined as the rate of change of the coupled power level divided by the rate of change of the power level of the attenuated beam, or the derivative coupled power level with respect to the power level of the attenuated beam. This last method of defining the coupling efficiency is the same as defining it to be the slope of the coupled power level as a function of the power level of the attenuated optical signal.

If the coupled power level is determined not to be saturated, then the power level of the attenuated optical beam measured in step 204 is checked to determine if it is greater than or equal to a maximum test power level, step 210. The maximum test power level is greater than the minimum test power level and less than about one half of the high power level of the unattenuated optical beam. Desirably, the maximum test power level may be less than about 20% of the high power level. If the maximum test power level has not been reached, the power level of the attenuated optical beam is increased, step 212, and steps 204, 206, and 208 are repeated. The power level of the attenuated optical beam is desirably increased by a power step, which is less than one half of the difference between the maximum test power level and the minimum test power level, so that at least three input power levels are tested for each test alignment tried.

If the power level of the attenuated optical beam is determined to be greater than or equal to the maximum test power level in step 210 (i.e. the maximum test power level is reached without saturating the coupled power level), the test alignment is determined to be a potential improved optical alignment. A coupling efficiency corresponding to the test alignment is then calculated as described above, step 214. This coupling efficiency is compared to a desired coupling efficiency to determine whether the current potential improved optical alignment is optimal enough to be selected without further searching, step 216. If coupling efficiency corresponding to the current test alignment greater than or equal to the desired coupling efficiency at maximum test power, then it is selected to be the improved optical alignment, step 224, and the exemplary alignment method is complete. In an alternative exemplary embodiment, an optimized optical alignment may be achieved by repeating the search of different optical alignment until the coupling efficiency at maximum test power cannot be improved further.

If the coupled power level is determined to be saturated in step 208 or the corresponding coupling efficiency is determined to be less than the desired coupling efficiency in step 216, then it is determined whether a predetermined number of Iterations have been performed, i.e. a predetermined number of test alignments have been tried, step 218. If the predetermined number of iterations have been performed, then the test alignment that had the highest corresponding coupling efficiency is determined to the improved optical alignment, step 224, the beam is realigned to the improved optical alignment and the exemplary alignment method is complete.

If the predetermined number of iterations has not been performed, the optical beam is attenuated back to the minimum test power, step 220, and the test alignment is changed by varying an alignment parameter of the test alignment, such as the size or the position of the beam spot formed on the coupling surface of the optical waveguide, the angle of incidence of the optical beam on the coupling surface, or the cone angle of the focused optical beam, step 222. Desirably, changing the test alignment may involve changing the separation between the focusing optical coupling element and the coupling surface of the optical waveguide or using the focusing optical coupling element to decrease the cone angle of the optical and, thus, to increase the size of the beam spot formed on the coupling surface of the optical waveguide. Alternatively, a spatial-filtering pinhole may be placed before the focusing lens to restrict the diameter of incident beam and increase the cone angle. This alternative method may cause a portion of the available beam energy to be lost using spatial filtering technique and, thus, may be undesirable in some applications.

Steps 204, 206, 208, 210, 212, 214, 216, 218, 220, and 222 may be repeated until, the improved optical alignment is determined.

Figure 5:
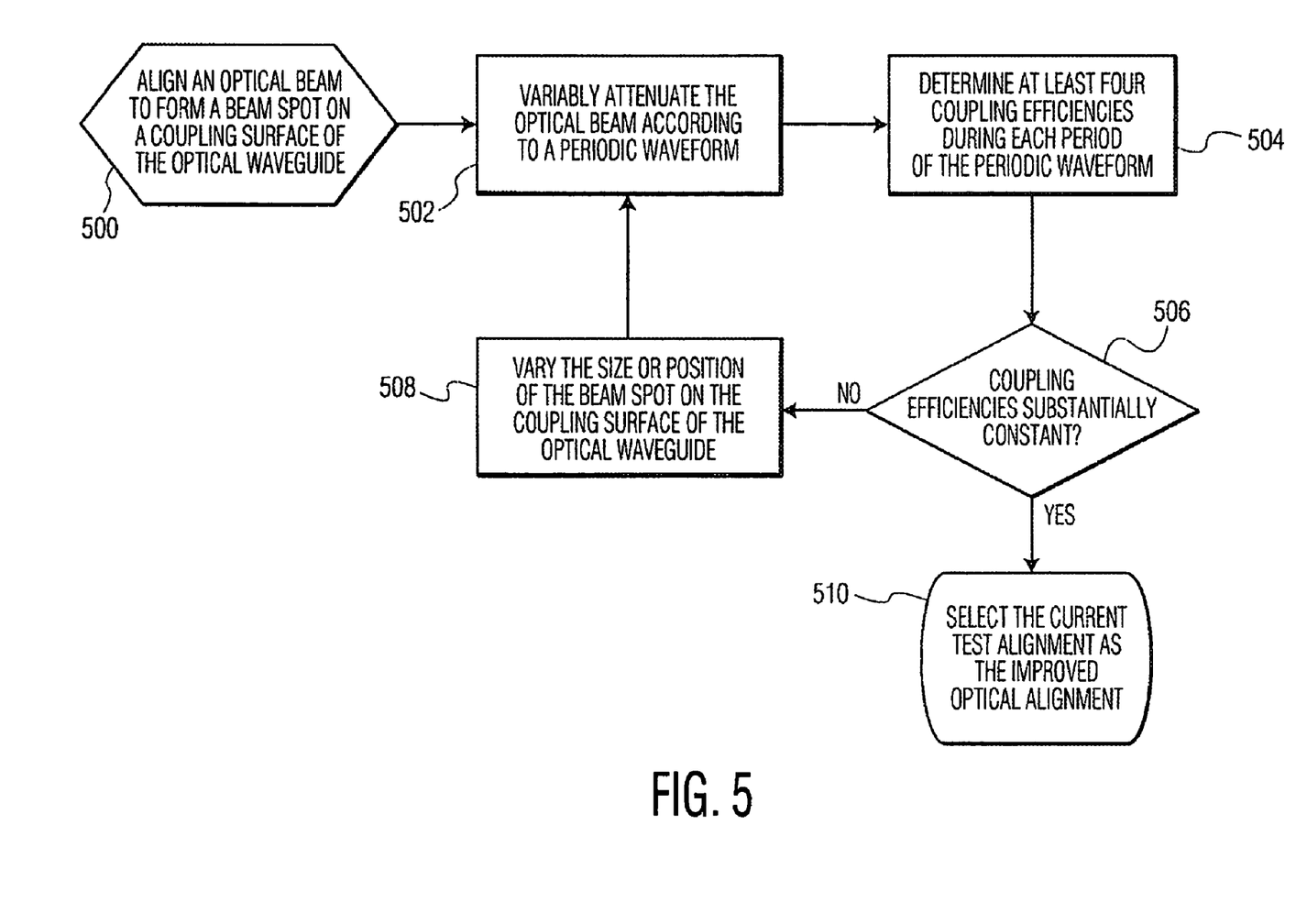
FIG. 5 is a flow chart illustrating an alternative exemplary method of determining an improved alignment for optically coupling high power optical beams into an optical waveguide according to the present invention.
Figure 6:
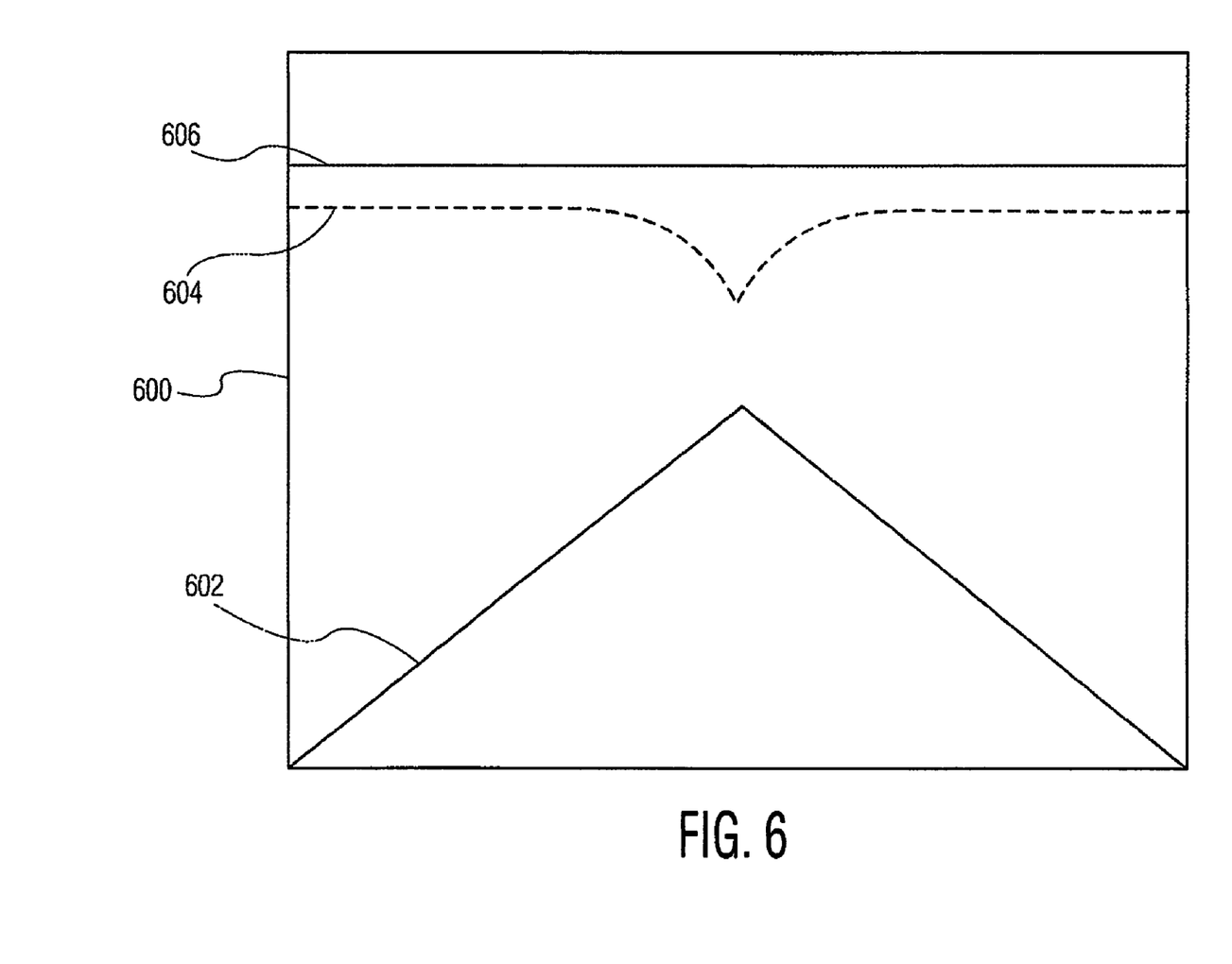
FIG. 6 is an exemplary screen image of an oscilloscope illustrating exemplary test results of the exemplary method of FIG. 5.

FIG. 5 illustrates an alternative exemplary method for determining an improved optical alignment to couple a portion of an optical beam having a high power level into an optical waveguide. FIG. 6 illustrates an exemplary display that may be used in the exemplary method of FIG. 5.

An attenuated optical beam is aligned in a test alignment such that a beam spot is formed on a coupling surface of the optical waveguide, step 500. This initial alignment may desirably result in the attenuated optical beam diverging at the beam spot as described above with reference to FIGS. 1 and 2 or may involve using a reduced numerical aperture optical system, as shown in FIGS. 7 and 8, to produce a smaller cone angle and larger diameter beam waist.

The optical beam is variably attenuated such that the power level of the attenuated optical beam varies between a minimum test power level and a maximum test power level according to a periodic waveform, step 502. The periodic waveform desirably has a predetermined period and may be any periodic waveform, such as a sinusoidal waveform, a sawtooth waveform, or a triangular waveform. FIG. 6 illustrates exemplary data from an embodiment of the method of FIG. 5 that uses triangular waveform 602 to vary the power level of the attenuated optical beam.

A plurality of coupling efficiencies corresponding to the test alignment are determined, step 504. The power levels of the attenuated optical beam and the coupled power levels of the portion of the optical beam coupled into the optical waveguide are sampled such that at least four coupling efficiencies may be determined during each period of the periodic waveform. It is desirable for the number of samples during each period to be significantly higher than four and it may also be desirably for the power levels of the attenuated optical beam and the coupled power levels to be sampled over several periods of the periodic waveform and averaged to reduce noise levels. It may also be desirable for the power levels sampled to include one power level sampled during each period of the periodic waveform at approximately the minimum test power level and one power level sampled during each period of the periodic waveform at approximately the maximum test power level.

The coupling efficiencies corresponding to the test alignment may then be analyzed to determine whether these coupling efficiencies decrease or are substantially constant as the power level of the attenuated optical beam is increased, i.e. whether the coupled power level becomes saturated or not, step 506. One exemplary method to determine whether the coupling efficiencies corresponding to the test alignment are substantially constant is compare the average value of the coupling efficiencies from near the maximum test power level to the average value of the coupling efficiencies from near the minimum test power level. If the average value of the coupling efficiencies from near the maximum test power level is greater than a certain percentage, for example 90%, of the average value of the coupling efficiencies from near the minimum test power level then the coupling efficiencies may be determined to be substantially constant.

An alternative exemplary method to determine whether the coupling efficiencies are substantially constant involves plotting the coupling efficiencies corresponding to the test alignment as a function of the phase of the periodic waveform to form a saturation plot, as shown in FIG. 6. Exemplary saturation graph 600 illustrates saturation plot 604 and period waveform plot 602. When saturation plot 604 is compared to straight line 606 it is easy to determine that the coupling efficiencies corresponding to this test alignment are not substantially constant.

If the coupling efficiencies are substantially constant over the entire periodic waveform, then the current test alignment may be selected as the improved optical alignment, step 510. However, as in the exemplary method of FIG. 2, this alignment may be rejected if the coupling efficiencies are deemed to be too low and the method may be repeated with a new initial alignment.

If the coupling efficiencies are not substantially constant over the entire periodic waveform, then the test alignment is changed to vary the size, position and/or the cone angle of the beam spot formed on the coupling surface of the optical waveguide, step 508. Steps 502, 504, 506, and 508 are repeated until the coupling efficiencies corresponding to a test alignment are found to be substantially constant. As in the exemplary method of FIG. 2, it is noted that the method may be stopped after a set number of iterations and the best alignment found to that point selected as the improved optical alignment.

In an experimental test illustrated in FIG. 4, a coupling and transmission efficiency at a low input power (about 100 µW) of better than 75% was obtained using the conventional constant-efficiency method to optimize the coupling of an optical beam into a 100 µm optical fiber. However, the output power from the optical fiber saturated at an input power level of about 1.5 mW as indicated by the circles 400. Further, the optical fiber is damaged by the focused laser beam at a slightly higher input power in the alignment configuration corresponding to circles 400. This is shown by the dotted damage threshold line. Another experimental alignment configuration, corresponding to triangle 402, raises the damage threshold, but does not improve the saturation level of output optical beam.

Using the exemplary embodiment of the present invention illustrated in FIG. 8, saturation of the coupled power level was substantially eliminated up to an input power of about 1.5 mW. Although the low power coupling efficiency of 45% was lower than the 75% achieved using the conventional method, the absolute output power level reached using an exemplary method of the present invention was much higher. The test data shown in FIG. 4 illustrates an increase of almost ten times in the maximum output power that may be coupled into and transmitted along the optical fiber with very weak or no saturation by using an exemplary method of the present invention. The inventors have determined that increases of more than one hundred times in the maximum coupled output power are possible using exemplary methods of the present invention.

The present invention includes exemplary methods to improve the coupling of high power optical beams into optical waveguides. The use of these exemplary methods allows increased coupling of optical power into optical waveguides and reduces the risk of potentially damaging the coupling surfaces of these optical waveguides. Such techniques may be useful in a number of technologies, such as laser machining, high power optical probes, and long haul optical communications. Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for determining an improved optical alignment to couple an optical beam having a high power level into an optical waveguide, the improved optical alignment determined such that a power level of a portion of the optical beam coupled into the optical waveguide is substantially maximized, the method comprising the steps of:
   a) reducing a power level of the optical beam to a minimum test power level, the minimum test power level being less than about one half of the high power level;

b) aligning the reduced-power optical beam in a test alignment such that a beam spot of the reduced-power optical beam is formed on a coupling surface of the optical waveguide;
c) measuring a coupled power level of the portion of the optical beam coupled into the optical waveguide;
d) increasing the power level of the reduced-power optical beam in predetermined steps to a maximum test power level and repeating step (c) for each power level;
e) if the coupled power level measured in step (c) does not saturate and a corresponding coupling efficiency is greater than or equal to a desired coupling efficiency, determining that the current test alignment is the improved optical alignment, completing the method, otherwise:
   i) reducing the power level of the optical beam to the minimum test power;
   ii) changing the test alignment to vary at least one of;
      a size of the beam spot formed on the coupling surface of the optical waveguide;
      a position of the beam spot formed on the coupling surface of the optical waveguide;
      an angle of incidence of the reduced-power optical beam on the coupling surface of the optical waveguide; or
      a cone angle of the reduced-power optical beam; and
   iii) repeating steps (c), (d), and (e), until a predetermined number of iterations are performed; and
f) if the predetermined number of iterations are performed, determining the test alignment having a highest of the corresponding coupling efficiencies to be the improved optical alignment.

2. The method according to claim 1, wherein the power level of the optical beam is reduced in step (a) by attenuating the optical beam.

3. The method according to claim 1, wherein the minimum test power level is less than about 5% of the high power level and the maximum test power level is less than about 20% of the high power level.

4. The method according to claim 1, wherein step (b) includes aligning the reduced-power optical beam such that the reduced-power optical beam is one of converging or diverging at the beam spot formed on the coupling surface of the optical waveguide in the test alignment.

5. The method according to claim 1, wherein:
step (b) includes the steps of:
   b1) centering the beam spot of the reduced-power optical beam on the coupling surface of the optical waveguide;
   b2) using a focusing optical coupling element to focus the beam spot of the reduced-power optical beam formed on the coupling surface of the optical waveguide such that the size of the beam spot is substantially minimized; and
   b3) increasing a separation between the focusing optical coupling element and the coupling surface of the optical waveguide to increase the size of the beam spot formed on the coupling surface of the optical waveguide to align the optical beam in the test alignment; and
changing the test alignment in step (e) includes increasing the separation between the focusing optical coupling element and the coupling surface of the optical waveguide to increase the size of the beam spot formed on the coupling surface of the optical waveguide.

6. The method according to claim 1, wherein:
step (b) includes the steps of:
   b1) centering the beam spot of the reduced-power optical beam on the coupling surface of the optical waveguide;
   b2) using a focusing optical coupling element to focus the beam spot of the reduced-power optical beam formed on the coupling surface of the optical waveguide such that the size of the beam spot is substantially minimized; and
   b3) decreasing a separation between the focusing optical coupling element and the coupling surface of the optical waveguide to increase the size of the beam spot formed on the coupling surface of the optical waveguide to align the optical beam in the test alignment; and
changing the test alignment in step (e) includes decreasing the separation between the focusing optical coupling element and the coupling surface of the optical waveguide to increase the size of the beam spot formed on the coupling surface of the optical waveguide.

7. The method according to claim 1, wherein:
step (b) includes the steps of:
   b1) centering the beam spot of the reduced-power optical beam on the coupling surface of the optical waveguide;
   b2) using coupling optics to substantially focus the beam spot of the reduced-power optical beam formed on the coupling surface of the optical waveguide such that the size of the beam spot is substantially minimized; and
   b3) using the coupling optics to increase the size of the beam spot formed on the coupling surface of the optical waveguide to align the optical beam in the test alignment; and
changing the test alignment in step (e) includes using the coupling optics to increase the size of the beam spot formed on the coupling surface of the optical waveguide.

8. The method according to claim 1, wherein step (b) includes aligning the reduced-power optical beam such that the coupled power level at the minimum test power level corresponding to the test alignment is substantially maximized.

9. The method according to claim 1, wherein:
step (c) includes the steps of:
   c1) measuring the power level of the reduced-power optical beam;
   c2) measuring the coupled power level of the portion of the optical beam coupled into the optical waveguide; and
   c3) determining a coupling efficiency corresponding to the test alignment using the power level measured in step (c1) and the coupled power level of step (c2).

10. The method according to claim 9, wherein step (c3) includes calculating the coupling efficiency corresponding to the test alignment by dividing a current coupled power level measured in step (c2) by a current power level of the reduced-power optical signal measured in step (c1).

11. The method according to claim 9, wherein step (c3) includes determining the coupling efficiency corresponding to the test alignment to be a slope of the coupled power level as a function of the power level of the reduced-power optical signal at a current power level of the reduced-power optical signal.

12. The method according to claim 9, wherein step (c3) includes the steps of:

c3a) calculating a coupled power level change by subtracting a previously measured coupled power level from a current coupled power level measured in step (c2);

c3b) calculating a power level change by subtracting a previously measured power level from a current power level measured in step (c1); and c3c) calculating the coupling efficiency corresponding to the test alignment by dividing the coupled power level change calculated in step (c3a) by the power level change calculated in step (c3b).

13. The method according to claim 9, wherein step (d) includes the steps of:

d1) increasing the power level of the reduced-power optical beam;

d2) determining if the coupled power level measured in step (c2) is saturated based on a comparison of the coupling efficiency corresponding to the current power level to at least one previously determined coupling efficiency corresponding to a lower power level; and d3) repeating steps (c) and (d) until:
i) the coupling efficiency is determined to be saturated in step (d2); or
ii) the maximum test power level is reached.

14. The method according to claim 1, wherein step (d) includes the steps of:

d1) increasing the power level of the reduced-power optical beam;

d2) determining if the coupled power level measured in step (c) is saturated based on a comparison of a coupled power level corresponding to a current power level of the reduced-power optical beam to at least one previously determined coupled power level corresponding to a lower power level; and d3) repeating steps (c) and (d) until:
i) the coupled power level is determined to be saturated in step (d2); or
ii) the power level measured in step (c1) is greater than or equal to the maximum test power level.

15. The method according to claim 1, wherein step (d) includes the steps of:

d1) increasing the power level of the reduced-power optical beam by a power step, the power step being less than one half of a difference between the maximum test power level and the minimum test power level; and d2) repeating step (c) and (d) until:
i) the coupled power level determined in step (c) saturates; or
ii) the power level of the reduced-power optical beam is greater than or equal to the maximum test power level.

16. A method for determining an improved optical alignment to couple a portion of an optical beam having a high power level into an optical waveguide, the improved optical alignment determined such that a power level of the portion of the optical beam coupled into the optical waveguide is substantially maximized, the method comprising the steps of:

a) aligning the optical beam in a test alignment such that a beam spot is formed on a coupling surface of the optical waveguide;

b) varying a power level of the optical beam between a minimum test power level and a maximum test power level according to a periodic waveform having a predetermined period, the maximum test power level being less than about one half of the high power level;

c) determining a plurality of coupling efficiencies corresponding to the test alignment such that at least four of the plurality of coupling efficiencies are determined during one predetermined period of the periodic waveform;

d) until the plurality of coupling efficiencies corresponding to the test alignment are substantially constant;
changing the test alignment to vary at least one of:
a size of the beam spot formed on the coupling surface of the optical waveguide;
a position of the beam spot formed on the coupling surface of the optical waveguide;
an angle of incidence of the reduced-power optical beam on the coupling surface of the optical waveguide; or
a cone angle of the reduced-power optical beam; and
repeating steps (b), (c), and (d); and e) determining the test alignment for which the plurality of coupling efficiencies corresponding to the test alignment are substantially constant to be the improved optical alignment.

17. The method according to claim 16, wherein the power level of the optical beam is varied in step (b) by variably attenuating the optical beam.

18. The method according to claim 16, wherein step (a) includes aligning the reduced-power optical beam such that the reduced-power optical beam is one of converging or diverging at the beam spot formed on the coupling surface of the optical waveguide in the test alignment.

19. The method according to claim 16, wherein:
step (a) includes the steps of:
a1) centering the beam spot of the reduced-power optical beam on the coupling surface of the optical waveguide;
a2) using a focusing optical coupling element to focus the beam spot of the reduced-power optical beam formed on the coupling surface of the optical waveguide such that the size of the beam spot is substantially minimized; and
a3) increasing a separation between the focusing optical coupling element and the coupling surface of the optical waveguide to increase the size of the beam spot formed on the coupling surface of the optical waveguide to align the optical beam in the test alignment; and
step (d) includes the steps of:
d1) increasing the separation between the focusing optical coupling element and the coupling surface of the optical waveguide to increase the size of the beam spot formed on the coupling surface of the optical waveguide to change the test alignment; and
d2) repeating steps (b), (c), and (d) until the plurality of coupling efficiencies corresponding to the test alignment are substantially constant.

20. The method according to claim 16, wherein:
step (a) includes the steps of:
a1) centering the beam spot of the reduced-power optical beam on the coupling surface of the optical waveguide;
a2) using a focusing optical coupling element to focus the beam spot of the reduced-power optical beam formed on the coupling surface of the optical waveguide such that the size of the beam spot is substantially minimized; and
a3) decreasing a separation between the focusing optical coupling element and the coupling surface of the optical waveguide to increase the size of the beam spot formed on the coupling surface of the optical waveguide to align the optical beam in the test alignment; and step (d) includes the steps of:
d1) decreasing the separation between the focusing optical coupling element and the coupling surface of the optical waveguide to increase the size of the beam spot formed on the coupling surface of the optical waveguide to change the test alignment; and
d2) repeating steps (b), (c), and (d) until the plurality of coupling efficiencies corresponding to the test alignment are substantially constant.

21. The method according to claim 16, wherein:
step (a) includes the steps of:
a1) centering the beam spot of the reduced-power optical beam on the coupling surface of the optical waveguide;
a2) using coupling optics to substantially focus the beam spot of the reduced-power optical beam formed on the coupling surface of the optical waveguide such that the size of the beam spot is substantially minimized; and
a3) using the coupling optics to increase the size of the beam spot formed on the coupling surface of the optical waveguide to align the optical beam in the test alignment; and step (d) includes the steps of:
d1) using the coupling optics to increase the size of the beam spot formed on the coupling surface of the optical waveguide to change the test alignment; and
d2) repeating steps (b), (c), and (d) until the plurality of coupling efficiencies corresponding to the test alignment are substantially constant.

22. The method according to claim 16, wherein step (a) includes aligning the reduced-power optical beam such that the coupling efficiency at the minimum test power level corresponding to the test alignment is substantially maximized.

23. The method according to claim 16, wherein the minimum test power level is less than about 5% of the high power level and the maximum test power level less than about 20% of the high power level.

24. The method according to claim 16, wherein the periodic waveform according to which the optical beam is variably reduced-power is one of a sinusoidal waveform, a sawtooth waveform, or a triangular waveform.

25. The method according to claim 16, wherein step (c) includes the steps of:
c1) sampling a plurality of power levels of the reduced-power optical beam such that at least four of the plurality of power levels are sampled during each predetermined period of the periodic waveform;
c2) sampling a plurality of coupled power levels of the portion of the optical beam coupled into the optical waveguide, each sampled coupled power level corresponding to one of the plurality of power levels of the reduced-power optical beam sampled in step (c1);
c3) determining the plurality of coupling efficiencies corresponding to the test alignment based on the plurality of power levels sampled in step (c1) and the plurality of coupled power levels sampled in step (c2).

26. The method according to claim 25, wherein the plurality of power levels of the reduced-power optical beam sampled in step (c1) are sampled over a plurality of predetermined periods of the periodic waveform.

27. The method according to claim 25, wherein the plurality of power levels of the reduced-power optical beam are sampled in step (c1) such that:
one of the at least four power levels sampled during each predetermined period of the periodic waveform is substantially equal to the minimum test power level; and
another one of the at least four power levels sampled during each predetermined period of the periodic waveform is substantially equal to the maximum test power level.

28. The method according to claim 25, wherein step (c3) includes calculating the each of plurality of coupling efficiencies corresponding to the test alignment by dividing one of the plurality coupled power levels measured in step (c2) by a corresponding one of the plurality power levels of the reduced-power optical signal measured in step (c1).

29. The method according to claim 25, wherein step (c3) includes the steps of:
c3a) calculating a plurality of coupled power level changes by subtracting a preceding coupled power level from each coupled power level of the plurality of coupled power levels measured in step (c2);
c3b) calculating a plurality of power level changes by subtracting a preceding power level from each power level of the plurality of power levels measured in step (c1); and
c3c) calculating the plurality of coupling efficiencies corresponding to the test alignment by dividing each coupled power level change of the plurality of coupled power level changes calculated in step (c3a) by the corresponding power level change of the plurality of power level changes calculated in step (c3b).

30. The method according to claim 16, wherein step (d) includes the steps of:
d1) plotting the plurality of coupling efficiencies corresponding to the test alignment as a function of a phase of the periodic waveform to form a saturation plot;
d2) comparing the saturation plot to a straight line to determine whether the plurality of coupling efficiencies corresponding to the test alignment are substantially constant;
d3) changing the test alignment to vary at least one of a size or a position of the beam spot formed on the coupling surface of the optical waveguide, unless the plurality of coupling efficiencies corresponding to the test alignment are determined to be substantially constant in step (d2); and
d4) repeating steps (b), (c), and (d), until the plurality of coupling efficiencies corresponding to the test alignment are determined to be substantially constant in step (d2).

31. The method according to claim 16, wherein the plurality of coupling efficiencies corresponding to the test alignment are determined to be substantially constant in step (d) if an average value of a first subset of the plurality of coupling efficiencies corresponding to the maximum test power level is greater than a predetermined percentage of an average value of a second subset of the plurality of coupling efficiencies corresponding to the minimum test power level.

32. The method according to claim 31, wherein the predetermined percentage is 90%.

* * * * *